United States Patent [19]

Morgan et al.

[11] 3,803,838

[45] Apr. 16, 1974

[54] APPARATUS AND METHOD OF TERMINATING THRUST OF A ROCKET MOTOR

[75] Inventors: Myron Morgan, Penryn; Steven D. Mitchell, Carmichael; Conrad R. Platt, Huntington Beach, all of Calif.

[73] Assignee: Aerojet-General Corporation, El Monte, Calif.

[22] Filed: July 28, 1970

[21] Appl. No.: 58,903

[52] U.S. Cl. ................................................ 60/254
[51] Int. Cl. .............................................. F02k 9/04
[58] Field of Search ...................... 60/254, 234, 256

[56] References Cited
UNITED STATES PATENTS

| | | | |
|---|---|---|---|
| 3,062,147 | 11/1962 | Davis et al. | 60/256 |
| 3,266,237 | 8/1966 | Crowell, Jr. et al. | 60/254 |
| 3,354,647 | 11/1967 | Aycock | 60/254 |
| 2,949,009 | 8/1960 | D'Ooge | 60/254 |

Primary Examiner—Samuel Feinberg
Attorney, Agent, or Firm—Mark C. Jacobs; Edward O. Ansell

[57] ABSTRACT

Combustion and thrust of a solid propellant rocket motor are terminated by igniting a pyrotechnic material contained within a tube of quenchant fluid such as water located within the hollow propellant grain within the motor chamber. Burning of the pyrotechnic pressurizes the quenchant, bursting its container, so that it is ejected at high velocity, in all directions in the chamber.

3 Claims, 3 Drawing Figures

3,803,838

MYRON MORGAN
STEVEN D. MITCHELL
CONRAD R. PLATT
INVENTORS

BY
I. Gordon Angus
ATTORNEY

APPARATUS AND METHOD OF TERMINATING THRUST OF A ROCKET MOTOR

This invention relates to solid propellant rocket motors and more particularly to means and method for terminating their thrust.

An object of the invention is to provide for a very rapid quench of the burning of propellant in a rocket motor.

Solid propellant grains in rocket motor chambers are commonly ignited by an igniter, and ordinarily the propellant burns until completely consumed. The gases from the combustion passing out through an exhaust nozzle attached to the rocket motor chamber produce the thrust of the motor.

Under some circumstances it is desirable to be able to terminate the combustion and thrust of the rocket motor at any desired time. It has heretofore been proposed to terminate propellant combustion in such a motor by quenching the burning by a suitable quenchant such as water. This has required a large quenchant reservoir external to the motor chamber and a complex pressurization system to inject the quenchant into the motor chamber against the high pressure within it.

In accordance with the present invention such a large and complex quenching system is avoided by containing the quenchant within the motor chamber itself and releasing it at the time it is desired to terminate combustion.

According to a feature of the invention the quenchant is held in a container within which there is a high pressure gas generating pyrotechnic material which upon burning, pressurizes the quenchant, bursting the container and sending the quenchant into the chamber and against the burning propellant surface. The quenchant impelled at high velocity by the pressure of the pyrotechnic can quench the burning propellant within milli-seconds after an extinguishment command.

The invention is preferably carried out by use of an internally burning type of propellant grain within the bore of which the quenchant container and its pyrotechnic are located. The pyrotechnic material is preferably contained in a sleeve within the quenchant container.

The foregoing and other features of the invention will be better understood from the following detailed description and the accompanying drawing of which:

Figure 1:
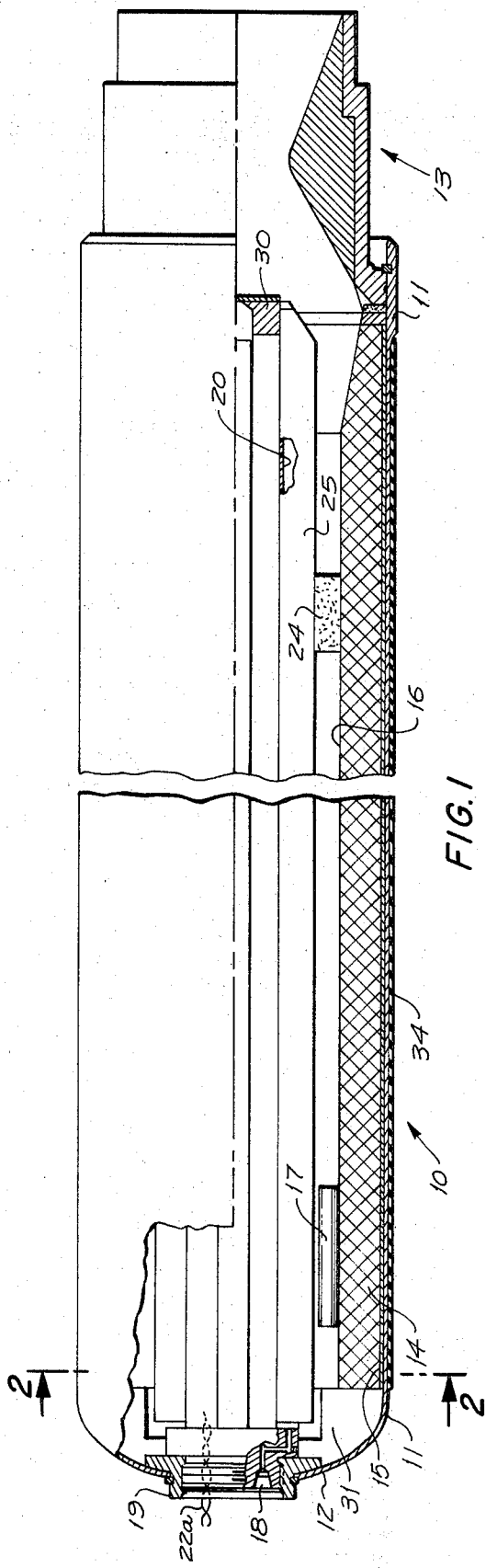
FIG. 1 is a longitudinal view of a rocket motor, partially in cross-section, embodying the present invention.
Figure 2:
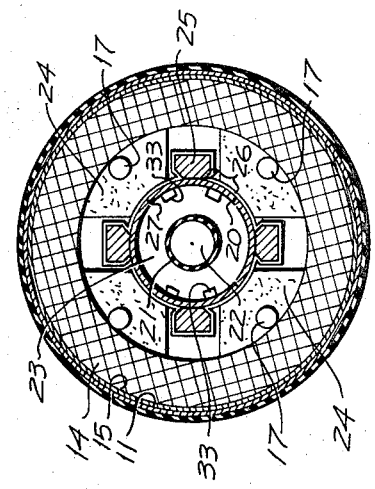
FIG. 2 is a cross-section view taken at line 2—2 of FIG. 1.

Referring to the drawings the rocket motor 10 comprises a chamber formed by a substantially cylindrical body or casing 11 ordinarily of a suitable metal such as steel having an outer wrapping 34, and closed at its forward nose portion 12 and having an exhaust nozzle 13 extending from the rear portion and having the usual venturi throat configuration, through which exhaust gases from the combustion of propellant in the rocket chamber are exhausted at high velocity to create the thrust of the motor. Within the cylindrical casing 11 there is placed a propellant grain 14 which may be a well-known type comprising a mixture of fuel and oxidizer in the form of an annulus of substantial thickness whose outer circumference is wrapped or covered with a liner 15 of a material such as rubber which impedes or restricts burning on this outer propellant surface. Burning occurs on the inner cylindrical wall 16 of the propellant grain, and for the purpose of igniting this inner grain surface there are provided a number of igniters 17 in the form of lenghts or capsules of an igniting material such as pellets of Boron Potassium Nitrate, angularly spaced around the interior surface of the grain. In FIG. 1 the igniter 17 is shown rotated 45° from its actual position, for the purpose of illustration. These igniters can be ignited in any suitable manner, for example by means of a hot wire igniting device the circuit wires of which can be brought out either through the nose or exhaust nozzle, if desired. The igniters which are well-known and require no detailed description here, may be held in place adjacent the propellant grain in any suitable manner, for example by epoxy adhesive or tape or the like.

The manner of operation of the motor as thus far described will be readily recognized. Ignition of the igniter will fire the entire inner cylindrical surface of the propellant grain and the burning progresses radially outwardly toward the outer surface of the grain until the grain is entirely consumed, unless it is extinguished prior to its complete consumption. The exhaust gases from the burning pass out at high velocity through the exhaust nozzle to create the thrust.

For the purpose of terminating the combustion at any desired time, there is provided a combustion quenching device. This comprises a thermally insulated cylindrical tube 20 which may be of metal such as aluminum or a phenolic within which there is concentrically located a tubular sleeve 21 of much smaller diameter than the tube 20. The sleeve 21 contains a combustible or pyrotechnic charge 22 which can be ignited by any suitable squib (not shown) actuated by suitable wiring 22a passing through a plug 19 closing an opening 18 in the nose and through tube 20 and sleeve 21 to the pyrotechnic. The annular space 23 between the sleeve 21 and the tube 20 is filled with a quenching liquid, ordinarily water or a water solution. The ends of tube 20 and sleeve 21 are sealed closed by suitable plugs or closures 30 so that neither the pyrotechnic charge 22 nor the quenching material can flow out of their respective containers. Sleeve 21 is held in its concentric position within the tube 20 by suitable spacers (not shown) placed in the space between the sleeve and tube. The tube 20 is held in its concentric position within the cylindrical motor casing 11 by being screwed into the forward boss of the motor case, as shown, or alternatively, by attaching to the aft end of the case through the nozzle attach flange.

For the purpose of preventing crushing of the tube 20 while the propellant is burning under normal operation to develop chamber pressure and thrust, it is desirable to place internal bulk-heads within the tube 20. These can be bars 33 of metal extending longitudinally through the tube and in contact with its inner surface and held at the ends. Thus any tendency of the tube to collapse under the chamber pressure is overcome by the inner surface of the tube bearing against these bulk-heads.

Upon ignition of the propellant grain all the igniter parts, ignition wiring, and the styrofoam blocks not consumed are blown out through the exhaust nozzle.

When it is desired to terminate the rocket motor thrust the pyrotechnic charge is burned, which ruptures the tube 21, pressurizing the coolant in space 23 which in turn bursts the cylinder 20 to release the coolant fluid to the combustion chamber and grain surface. For controlling the quench fluid dissipation pattern when the explosive is fired, this tube is scored at spaced intervals around its circumference to control the dispersion of the quench fluid pattern commensurate with the propellant grain design. This causes an even rupture at the score lines around the tube. Rigid bars 25 extending longitudinally and held at their ends in contact with the outer surface of tube 20, mid-way between these rupturing score lines, act as hinges around which the ruptured sides of the tube open up releasing the quenchant at high velocity radially around the tube and into the combustion chamber toward the burning surface of the propellant grain.

For the best quenching results it is desired that the pyrotechnic material 22 be selected both as to quantity and performance so that pressure will be exerted on the quenchant by the pyrotechnic in sufficient intensity and for a sufficient time period to drive the quenchant out of its tube and on to the burning propellant surface. It has been found that a mixture of four parts by weight of a 4FG Dupont black powder and three parts by weight of of FG Dupont black powder, obtainable from E. I. Dupont DeNeymoures & Company, Willmington, Delaware, is a satisfactory mixture for the pyrotechnic. The quantity of this material will of course depend on the amount of quenchant in the tube, which in turn will be selected according to the dimensions of the rocket motor. The optimum amount of quenchant, for example water, can be calculated in relation to the amount of burning surface and temperature of the burning propellant, such that it is sufficient to reduce the temperature within the motor chamber to a point below that required to support the combustion.

A test was made using a rocket motor having a cylindrical chamber casing of about 9-½ inches in diameter and 43 inches in length with a hollow cylindrical propellant grain of similar length having an internal diameter of about 6-¼ inches and containing a central quenchant tube about 41 inches long by 2-¾ inches outside diameter with an internal sleeve holding the explosive, of about ⅝ inches diameter and the same length as the tube. The amount of water quenchant in the tube was about 3 quarts, and the amount of pyrotechnic in the sleeve about 40 grams of 4FG Dupont black powder mixed with 30 grams of FG Dupont black powder.

Figure 3:
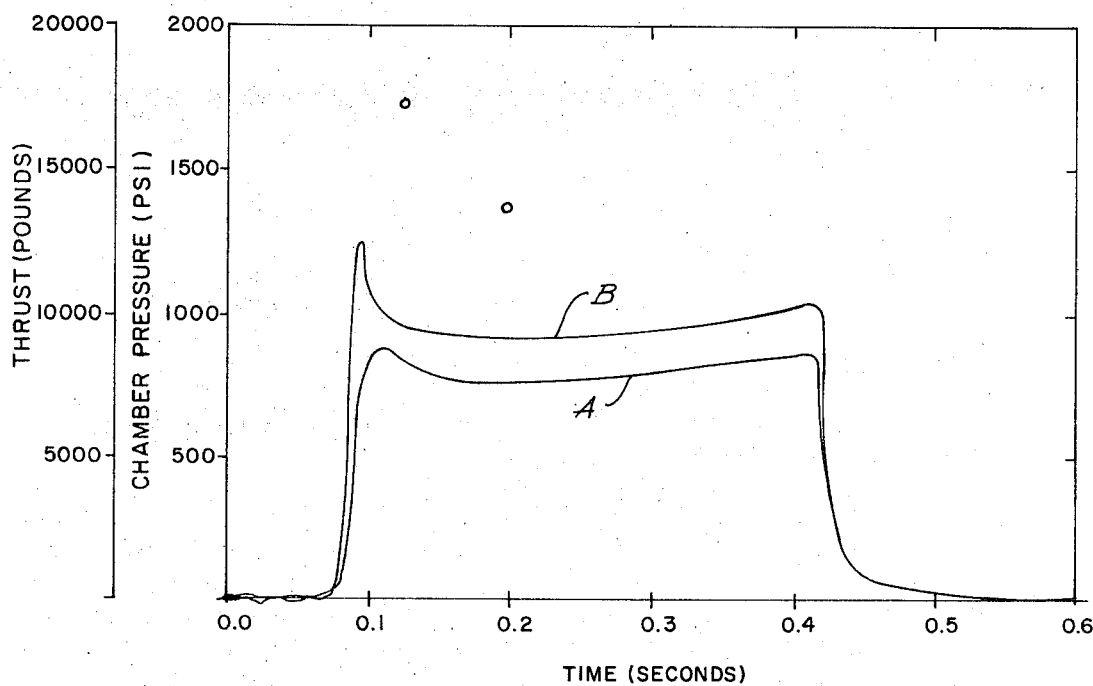
FIG. 3 illustrates graphically the effect of quenching the burning.

FIG. 3 illustrates results of the test. In the chart of FIG. 3 the abscissa represents time in seconds, and of the two ordinate scales, one represents the combustion chamber pressure in pounds per square inch, and the other, the thrust of the motor in pounds. Curve A represents the chamber pressure and curve B represents the thrust. As represented in the chart, the propellant was ignited just prior to 0.1 seconds in time, and immediately after 0.4 seconds in time the pyrotechnic in the quenchant tube was ignited. The chamber pressure rose steeply to its maximum somewhat under 1,000 pounds per square inch at 0.1 seconds and remained substantially uniform until the burning of the pyrotechnic, whereupon the pressure dropped almost to zero within milli-seconds and became zero at 0.6 seconds in time. The thrust followed a similar pattern and dropped even more abruptly upon burning of the pyrotechnic than the chamber pressure.

What is claimed is:

1. A rocket motor having a combustion chamber with an exhaust nozzle at one end thereof in communication with said chamber and a solid propellant grain within the chamber, said combustion chamber extending longitudinally within said motor and said grain having a longitudinal opening through it, said opening being coaxial with respect to the longitudinal axis of said chamber thereby providing an inner burning surface, a rupturable first container forming a tube coaxially disposed within and retained within said opening, and which first container contains a quenching fluid therein and is scored at spaced intervals for controlling rupturing at the scores, a second rupturable container retained coaxially within the first container and said second container having a pyrotechnic material therein, and means operatively engaged with the pyrotechnic material for selectively igniting the pyrotechnic material to thereby rupture said second container in a manner pressurizing the quenching fluid in said first container, causing it to burst the rupturable first container and be expelled into the combustion chamber, thereby terminating the combustion of the propellant grain by heat absorption and rapid pressure drop.

2. The rocket motor of claim 1 in which restraining bars extend longitudinally along the exterior of the tube at positions between the scores to restrain expansion of the tube at the bars when the quenchant is pressurized, thereby acting as hinges which facilitate opening of the tube at the scores when the quenchant is pressurized.

3. A rocket motor having a combustion chamber with an exhaust nozzle at one end thereof in communication with said chamber and a solid propellant grain within the chamber, said combustion chamber extending longitudinally within said motor and said grain having a longitudinal opening through it, said opening being coaxial with respect to the longitudinal axis of said chamber thereby providing an inner burning surface a rupturable first container coaxially disposed within and retained within said opening, and which first container is a tube and contains a quenching fluid therein with bulkheads located within the tube to prevent crushing of the tube when the chamber is pressurized by combustion of the propellant grain, a second rupturable container retained coaxially within the first container and said second container having a pyrotechnic material therein, and means operatively engaged with the pyrotechnic material for selectively igniting the pyrotechnic material to thereby rupture said second container in a manner pressurizing the quenching fluid in said first container, causing it to burst the rupturable first container and be expelled into the combustion chamber, thereby terminating the combustion of the propellant grain by heat absorption and rapid pressure drop.

* * * * *